Nov. 1, 1932.  S. A. HASTINGS  1,886,014
BEARING CONSTRUCTION
Filed April 2, 1931  2 Sheets-Sheet 1
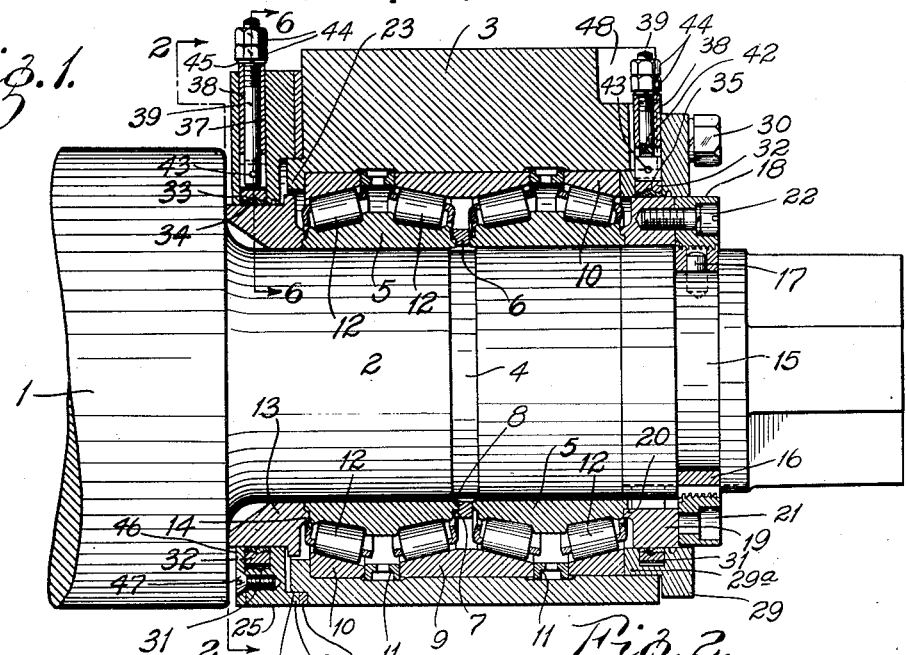
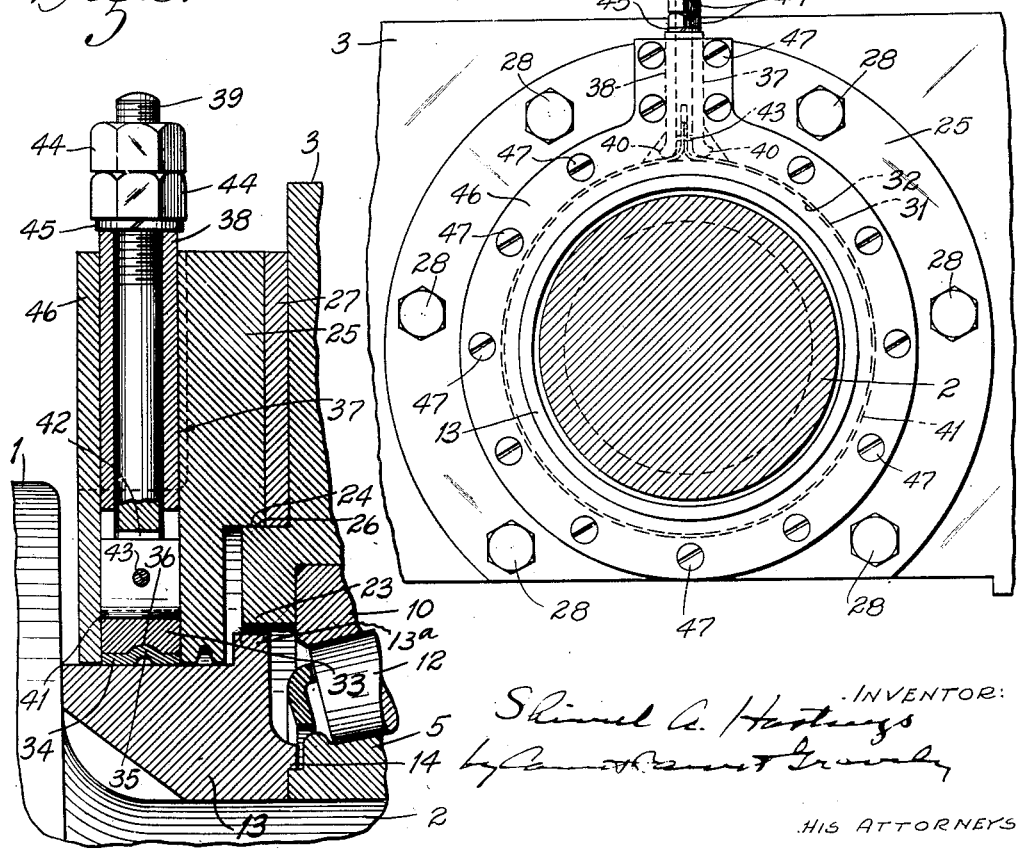
INVENTOR:
Shinnel A. Hastings
HIS ATTORNEYS.

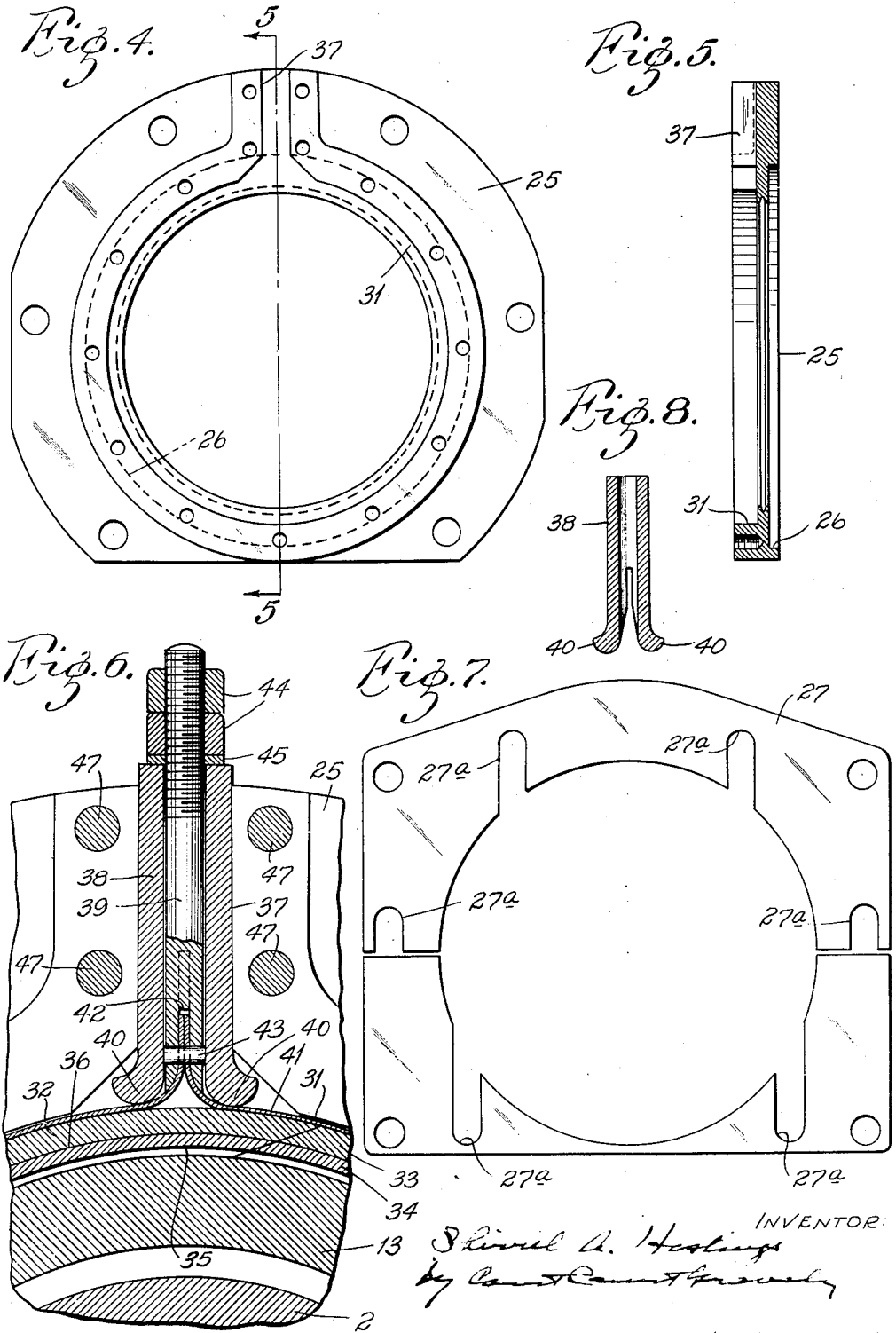

Patented Nov. 1, 1932

1,886,014

UNITED STATES PATENT OFFICE

SHIRREL A. HASTINGS, OF CANTON, OHIO, ASSIGNOR TO THE TIMKEN ROLLER BEARING COMPANY, OF CANTON, OHIO, A CORPORATION OF OHIO

BEARING CONSTRUCTION

Application filed April 2, 1931. Serial No. 527,133.

My invention relates to bearing constructions, particularly to bearing constructions having enclosures wherein packing rings are used as a sealing means. The parts of such an enclosure necessarily wear during constant use thereof and oil will seep out of the bearing unless some means are provided for adjusting and tightening the packing rings and related parts; and the principal object of this invention is to devise a bearing construction having an enclosure which can be readily adjusted for initial tightness, and thereafter to compensate for wear of the packing. Another object is to provide a construction which can be readily assembled and dismantled.

My invention consists principally in surrounding a novel split packing ring with a strap of thin flexible material whose ends are clamped together by means of an adjusting member which is movable in a radial direction from and towards the center of the bearing journal for varying the tightness of the packing ring. My invention also consists in the parts and in the arrangements and combinations of parts hereinafter described and claimed.

In the accompanying drawings, which form part of this specification, and wherein like reference symbols refer to like parts wherever they occur, Fig. 1 is a vertical longitudinal sectional view of a rolling mill roll bearing assembly equipped with bearing enclosures embodying my invention, Fig. 2 is a view on the line 2—2 of Fig. 1, Fig. 3 is an enlarged sectional view of the upper left hand portion of Fig. 1, Fig. 4 is an end view of the inboard closure ring shown in Fig. 1, Fig. 5 is a sectional view on the line 5—5 of Fig. 4, Fig. 6 is a sectional view on the line 6—6 of Fig. 1, Fig. 7 is an end view of the inboard closure plate shown in Fig. 1, and Fig. 8 is a vertical sectional view taken through the middle of an adjusting collar used with my enclosure.

In the construction illustrated, a roll body 1 has a neck portion 2 which extends into a bearing housing 3. An annular recess 4 is provided around the neck portion near the center thereof, and two double cones 5 are mounted on the neck, one on each side of said recess 4. The cones are separated by a suitable cone spacer ring 6 whose inner periphery is spaced from the bottom of the annular recess 4 by means of an annular rib 7 extending from one end of said ring and surrounding an annular rib 8 provided on the end of one of the cones. Mounted in the central part of the bearing housing 3 is a double cup 9 whose raceways are adapted to cooperate with the inner raceways of the two double cones. Mounted near each end of the bearing housing respectively, are single cups 10 which are separated from the double cup by cup spacer rings 11, and four series of rollers 12, mounted in suitable cages, are interposed between the cones and cups.

Mounted on the inner end of the neck 2 is an inboard spacer ring 13 whose inner end abuts against the roll body 1 and whose outer end is provided with an annular flange 14 which abuts against the adjacent end of the cone on the inboard side of the neck portion. The spacer ring 13 is also provided with an annular rib 13a near its outer end. The outboard end of the neck is provided with an annular recess 15 adapted to receive a split ring 16 mounted therein, and a pin 17 extends through a radial opening in said ring and projects into an adjacent opening provided therefor in the bottom of the annular recess. Surrounding said split ring and having threaded engagement therewith is an adjusting nut or ring 18 whose inner end abuts against the outer end of an outboard spacer ring 19 which is mounted on the neck 2 and keyed thereto. The inner end of said spacer ring 19 is provided with an annular flange 20 which abuts against the adjacent end of the cone at that end of the neck. Preferably, the threaded portions of the adjusting nut and split ring are covered with white lead during assembly thereof; and the adjusting nut 18 is provided with a series of openings 21 therethrough for a screw 22 which is adapted to extend through one of the openings 21 and into a threaded opening in the top portion of the outboard spacer ring when the nut 18 is properly positioned.

The outer end of the inner single cup abuts against the side of an inwardly extending annular flange 23 provided on the inboard side of the housing. This flange also extends outwardly from the end of the housing and the outer periphery thereof constitutes an annular shoulder 24 surrounding the bearing opening. An inboard closure ring 25 is mounted around the spacer ring and the diameter of its opening is increased adjacent to the journal housing to form an annular shoulder 26 which surrounds the outer end of the annular shoulder 24 provided on the side of the bearing housing. A centrally perforated closure filler plate 27, which is split into an upper and lower half in order to facilitate assembling and dismantling of the bearings, is interposed between the closure ring 25 and the bearing housing 3 and is held in place by means of a series of bolts 28 extending through openings in the closure ring, through openings 27a in the filler plate itself, and into threaded openings in the bearing housing.

The outboard enclosure arrangement is different from that of the inboard. Mounted around the outboard spaced ring 19 is an outboard closure ring 29 which is provided with an annular flange 29a whose end abuts against the adjacent end of the cup at that end of the neck. A series of openings are provided around the closure ring and it is secured to the bearing housing by means of bolts 30 which extend through said openings and into adjacent threaded openings provided in the bearing housing.

Both the outboard and inboard closure rings are provided with an annular recess 31 around their inner periphery and each of said recesses is adapted to receive a combination packing ring 32 which is split at an angle to a radial line thereof at the top. Said packing ring comprises an outer ring of flax or other suitable fibrous sealing material 33, and an inner ring of Babbitt metal 34 which is provided with a semicircular annular rib 35 on the middle of its outer periphery which engages an annular groove 36 around the inner periphery of the outer ring 33. Communicating with the annular recess 32 of each enclosure ring is a radial opening 37 of square cross-section provided in the top portion of the enclosure ring, and a sleeve member 38 called an adjusting collar is mounted in each radial opening. Into the opening of each collar is inserted a pin member or adjusting screw 39, and the lower end of both the collar and pin are split longitudinally through the middle. The two lower end portions of the adjusting collar are spread apart and each is provided with a flared out portion 40 on the outside thereof whose bottom peripheral portion is curved in such a manner as to extend tangentially to and slightly spaced from, the outer periphery of the packing ring.

Mounted around each packing ring is a strap-like band 41 of thin flexible metal whose main body portion is annular in shape and surrounds the packing ring, and whose two end portions are bent upwardly and extend into a slot 42 in the bottom of the pin member 39 formed by slitting the same longitudinally. The ends of the strap 41 are held in the slot 42 by means of a pin 43 extending through the ends of the pin member and through the two ends of the strap. The top portion of the pin member extends above the top of the collar and is threaded for receiving two nuts 44. Preferably a spring lock washer 45 is interposed between the top of the adjusting collar and the lower nut to insure stability of the adjustment screw 39 once the packing has been properly adjusted.

The annular recess 31 for the packing ring of the inboard enclosure ring is adjacent to the outer end thereof and is closed on that end by means of a closure cover ring 46 which is secured to the inboard closure ring by means of screws 47 which extend through openings in said cover plate and into threaded openings in the enclosure ring. As the radial opening in the top of the outboard spacer ring is located adjacent to the top portion of the bearing housing, the bearing is provided with a recess 48 to make room for getting at the adjusting nuts 44.

Obviously, with my type of bearing construction and enclosure, initial tightness of the packing is accomplished by merely tightening or loosening the nuts on the adjusting screw until the desired tightness of the packing is obtained, and further adjustment thereof to compensate for wear is accomplished in the same manner.

Moreover, with my bearing construction, the entire bearing assembly is readily removed for the purpose of replacing worn out parts, or the like. In order to remove the bearings, all that it is necessary to do is to remove the retaining devices at the outer end of the roll neck and then remove the bolts 28 at the inboard side of the bearing; with these bolts removed, the upper and lower half sections of the split filler plate 27 are then pulled out of the space between the end of the closure ring 25 and the end of the housing. With these two parts of the filler plate removed, the closure ring 25 is then shoved over until it strikes the side of the annular rib 13a on the spacer ring 13, and then pressure can be exerted against the closure ring to strip the entire journal assembly from the roll neck.

While I have illustrated my invention in connection with a rolling mill bearing assembly, my invention is applicable to bearings of almost any type, whether plain or roller, and hence I do not wish to be limited in any way to the precise construction shown.

What I claim is:

1. The combination of a housing with a journal member extending therein and movable with respect thereto, bearings interposed between said journal member and said housing, an annular member mounted on said journal member near one end of said housing, an enclosure ring secured to the end of said housing and surrounding said annular member, a filler plate split in two parts interposed between said housing and said enclosure ring, said enclosure ring having an annular recess around its inner periphery and a lateral opening communicating therewith, a packing ring mounted in said recess, a strap surrounding said packing ring and having its ends extending into said lateral opening, and a pin movably mounted in said opening for adjustable movement lengthwise thereof, the ends of said strap being secured to said pin.

2. The combination of a housing, a roll body having a neck portion extending into said housing, an inner raceway member mounted on said neck portion, an outer raceway member mounted in said housing and cooperating with said inner raceway member, a series of rollers interposed between said inner and said outer raceway members, respectively, a spacer ring mounted on said neck portion having its one end abutting against the end of said inner raceway member and its other end abutting against the roll body, an enclosure ring surrounding said spacer ring, a perforated filler plate split in two parts assembled between the inner end of said enclosure ring and the end of said housing, means for securing said enclosure ring and said filler plate to said housing, said enclosure ring having an annular recess around its inner periphery and a lateral opening communicating therewith, a sleeve slidably mounted in said lateral opening, a pin member disposed in said sleeve, means for adjustably changing the position of said pin with respect to said sleeve, a packing ring mounted in said annular recess and surrounding said spacer ring, and a strap surrounding said packing ring having its ends extending into said lateral opening and secured to the pin member.

3. The combination of a roll bearing housing having an annular flange extending outwardly from its end around the journal opening, a roll body having a neck portion extending into said housing, an inner raceway member mounted on said neck portion, an outer raceway member mounted in said housing and cooperating with said inner raceway member, a series of rollers interposed between said inner and said outer raceway members, respectively, a spacer ring mounted on said neck portion and having its one end abutting against the end of said inner raceway member and its other end abutting against the roll body, an enclosure ring surrounding said spacer ring and having an increased opening on the end adjacent to the housing forming an annular shoulder surrounding the end portion of the outwardly extending annular flange, a split perforated filler plate assembled between the enclosure ring and the housing around the annular outwardly extending annular flange, means for securing said enclosure ring and said filler plate to said housing, said enclosure ring having an annular recess on the outer end thereof around its inner periphery and a radial opening communicating therewith, a split packing ring mounted in said annular recess and a strap mounted in said annular recess and surrounding said spacer ring and having its ends extending into said radial opening, adjusting means provided in said opening and connected to the ends of said strap for tightening the same, and a closure cover ring secured to said enclosure ring for closing the end of the annular recess in which the packing ring is mounted.

4. The combination of a housing and a journal member extending therein, roller bearings interposed between said housing and said journal member, a closure ring inserted around said journal member near the end of said housing, a filler plate that is split in two parts interposed between the end of said closure ring and the end of said housing and removable means for securing said closure ring and said filler plate to said housing.

5. The combination of a housing and a journal member extending therein, roller bearings interposed between said housing and said journal member, a spacer ring mounted on said journal member and having its one end abutting against the inner raceway member of said roller bearings, said spacer ring having an annular rib on its outer periphery, an enclosure ring surrounding said spacer ring, a split filler plate interposed between the end of said closure ring and the end of said housing and removable means for securing said closure ring and said filler plate to said housing.

6. The combination of a housing, a roll body having a neck portion extending into said housing, an inner raceway member mounted on said neck portion, an outer raceway member mounted in said housing for cooperating with said inner raceway member, rollers interposed between said inner raceway member and said outer raceway member, a spacer ring mounted on said neck portion and having its one end abutting against the end of said inner raceway member and its other end abutting against the roll body, said spacer ring having an annular rib on its outer periphery, a closure ring surrounding said spacer ring between said annular rib and the roll body, a perforated filler plate that is split in a plurality of parts interposed between the end of said closure ring and the end of said housing, and a series of bolts extending through said closure ring and said filler plate and into said housing for securing said closure ring and the parts of said filler plate to said housing.

7. The combination of a housing, a roll body having a neck portion extending into said housing, bearings interposed between said housing and said journal member, a spacer ring mounted on said journal member having its one end abutting against the end of the inner raceway member of said bearings and its other end abutting against the roll body, a closure ring mounted around said spacer ring and carrying adjustable sealing means surrounding said spacer ring, a perforated filler plate that is split in a plurality of parts interposed between the end of said closure ring and the end of said housing and removable members for securing said closure ring and the parts of said filler plate to said housing.

8. The combination of a housing, a roll body having a neck portion extending into said housing, bearings having inner and outer raceway members interposed between said neck portion and said housing, a spacer ring mounted around said journal member having its one end abutting against the roll body and its other end abutting against the end of the inner raceway member, a closure ring surrounding said spacer ring, a split filler plate interposed between the end of said closure ring and the end of said housing, removable means for securing said closure ring and the parts of said filler plate to said housing, and removable retaining means for engaging the outermost ends of the bearing members to hold them in place.

Signed at Canton, Ohio, this 30th day of March 1931.

SHIRREL A. HASTINGS.